United States Patent
Heinrich et al.

(10) Patent No.: US 8,635,772 B2
(45) Date of Patent: Jan. 28, 2014

(54) METHOD OF DAMPING VIBRATIONS DURING A MACHINING OPERATION

(75) Inventors: Stefan Heinrich, Adelshofen (DE); Arndt Glaesser, Dachau (DE); Goetz Lebkuechner, Germering (DE)

(73) Assignee: MTU Aero Engines GmbH, Munich (DE)

( * ) Notice: Subject to any disclaimer, the term of this patent is extended or adjusted under 35 U.S.C. 154(b) by 608 days.

(21) Appl. No.: 12/160,751

(22) PCT Filed: Jan. 12, 2007

(86) PCT No.: PCT/DE2007/000035
§ 371 (c)(1),
(2), (4) Date: May 5, 2010

(87) PCT Pub. No.: WO2007/082504
PCT Pub. Date: Jul. 26, 2007

(65) Prior Publication Data
US 2010/0212158 A1    Aug. 26, 2010

(30) Foreign Application Priority Data
Jan. 19, 2006   (DE) .......................... 10 2006 002 617

(51) Int. Cl.
*B21D 53/78* (2006.01)
*B23P 13/02* (2006.01)
*B23P 15/02* (2006.01)

(52) U.S. Cl.
USPC ......... 29/889.7; 29/558; 29/889.2; 29/889.71

(58) Field of Classification Search
USPC .............. 29/424, 527.2, 530, 889.2; 156/279; 188/378; 416/241 A, 500; 464/180
See application file for complete search history.

(56) References Cited

U.S. PATENT DOCUMENTS

| 4,498,987 | A | | 2/1985 | Inaba |
| 5,079,821 | A | | 1/1992 | Parsons |
| 5,691,037 | A | * | 11/1997 | McCutcheon et al. ........ 428/172 |
| 5,867,885 | A | | 2/1999 | Bales et al. |
| 6,213,721 | B1 | * | 4/2001 | Watkinson ................ 416/244 A |
| 6,471,484 | B1 | * | 10/2002 | Crall .......................... 416/229 R |
| 7,445,685 | B2 | * | 11/2008 | Deakin et al. ................. 156/212 |
| 2003/0213660 | A1 | * | 11/2003 | Bhattacharya et al. ....... 188/267 |
| 2003/0217791 | A1 | * | 11/2003 | Bamberg et al. ............. 148/525 |
| 2006/0104817 | A1 | * | 5/2006 | Bonnet ..................... 416/229 R |
| 2010/0074704 | A1 | | 3/2010 | Rozic et al. |
| 2010/0221113 | A1 | * | 9/2010 | Cairo ........................ 416/193 A |

FOREIGN PATENT DOCUMENTS

| DE | 28 12 719 | | 9/1979 |
| DE | 43 00 627 | A1 | 7/1994 |
| DE | 43 00 643 | A1 | 7/1994 |
| EP | 0 881 030 | A1 | 12/1998 |
| GB | 2 181 374 | A | 4/1987 |
| SU | 619321 | | 7/1978 |

* cited by examiner

*Primary Examiner* — Alexander P Taousakis
(74) *Attorney, Agent, or Firm* — Crowell & Moring LLP

(57) ABSTRACT

A method for the milling machining of components is disclosed. The method produces recesses with one or more lateral walls, in particular for the production of integrally bladed rotors for gas turbines, the recesses forming flow channels and the lateral walls forming blade surfaces of an integrally bladed rotor. The component to be machined by milling is clamped in a locating device for the milling machining. To adjust the vibrational properties of the component to be machined by milling, areas of the component are embedded in and/or filled with a machinable plastic.

6 Claims, No Drawings

METHOD OF DAMPING VIBRATIONS DURING A MACHINING OPERATION

This application claims the priority of International Application No. PCT/DE2007/000035, filed Jan. 12, 2007, and German Patent Document No. 10 2006 002 617.9, filed Jan. 19, 2006, the disclosures of which are expressly incorporated by reference herein.

BACKGROUND AND SUMMARY OF THE INVENTION

The invention relates to a method for the milling machining of components.

Modern gas turbines, in particular aircraft engines, must satisfy the highest demands with respect to reliability, weight, power, economy and service life. In the last few decades, aircraft engines were developed particularly in the civilian sector that fully satisfied the foregoing requirements. In the development of aircraft engines, the selection of materials, the search for new, suitable materials and the search for new production methods play a crucial role.

The most important materials that are used nowadays for aircraft engines or other gas turbines are titanium alloys, nickel alloys (also called super alloys) and high-strength steels. The high-strength steels are used for shaft parts, gear parts, the compressor housing and turbine housing. Titanium alloys are typical materials for compressor parts. Nickel alloys are suitable for the hot parts of the aircraft engine.

Above all, precision casting, forging and milling are known from the prior art as production methods for gas turbine components made of titanium alloys, nickel alloys or other alloys. All highly stressed gas turbine components, such as, e.g., the blades for a compressor, are forgings. Rotor blades and guide vanes of the turbine, on the other hand, are designed, as a rule, as precision castings. Integrally bladed rotors, such as blisks (bladed disks) or blings (bladed rings), can be manufactured by milling from the solid according to the prior art. Milling from the solid is used primarily in the manufacture of blisks or blings from titanium materials. The milling of integrally bladed rotors from nickel materials is problematic due to the poor machinability of the nickel material.

In order to hold or fix components to be machined by milling during the milling machining, in practice, the components to be machined by milling are clamped in a locating device. Despite this, the problem exists that the to-be-machined components are induced to vibrate during the milling machining.

Vibrations of this type during the milling machining can cause damage especially to areas of the component to be machined by milling that are sensitive to vibrations. So far no approaches are known from the prior art that make allowances for this problem.

Starting herefrom, the present invention is based on the objective of creating a novel method for the milling machining of components.

According to the invention, to adjust the vibrational properties of the component to be machined by milling, areas of the component are embedded in and/or filled with a machinable plastic.

DESCRIPTION OF THE EXEMPLARY EMBODIMENTS

In the scope of the present invention, areas of the component to be machined by milling are embedded in and/or filled with a machinable plastic in order to thereby adjust the vibrational properties of at least these areas of the component to be machined by milling. The tendency to vibrate of the component to be machined by milling can be reduced hereby so that the risk of damage to the component during milling can be reduced considerably.

Reduced vibrations in the milling machining furthermore guarantee improved quality of the surface produced by milling. In addition, the milling tools used for milling are subject to lower stress, making it possible to realize higher service lives of the milling tools and therefore lower tool costs.

According to another advantageous development of the invention, the areas of the component are embedded in and/or filled with a machinable and magnetic plastic.

Cavities and/or exposed projections of the component to be machined by milling are preferably embedded in and/or filled with the machinable plastic.

The invention at hand relates to a method for the milling machining of components, in particular of components of a gas turbine aircraft engine, such as an integrally bladed rotor for example.

For milling, components are clamped in a locating device in order to thereby align the components to be machined by milling in terms of their position with respect to a milling tool during the milling machining. During the milling machining, a to-be-machined component as well as the milling tool used for milling are induced to vibrate. Vibrations impair the surface quality that can be produced during milling. In addition, areas of the component to be machined by milling that are sensitive to vibrations or unstable can be damaged by the vibrations. Furthermore, the milling tool used for milling can be damaged as a consequence of the vibrations.

It is provided within the scope of the present invention to embed and/or fill areas of the component to be machined by milling with or in a machinable plastic in order to thereby adjust the vibrational properties of the component or the embedded or filled area of the component. In doing so, the vibrational properties are adjusted for the purpose of reducing the tendency to vibrate. The reduction of vibrations of the component during milling provides that higher quality surfaces can be manufactured during milling. In addition, the risk of component damage, in particular on areas of the component that are sensitive to vibrations, is reduced. In addition, the milling tools used for milling are subject to lower stress.

To adjust the vibrational properties, areas of the component that are sensitive to vibrations or unstable are preferably embedded in and/or filled with the machinable plastic. As a result, for example cavities and/or exposed projections of the component to be machined by milling can be embedded and/or filled. The plastic is preferably a magnetic plastic, the advantage of which is that, after the milling, chips of the component material can be separated from chips of the plastic by magnetic separation.

The inventive method is preferably used in the production of integrally bladed gas turbine rotors. To-be-milled recesses form flow channels in the process and the forming side walls form blade surfaces of the integrally bladed gas turbine rotor. The procedure in the production of an integrally bladed gas turbine rotor is such that first every second recess between adjacent rotor blades of the gas turbine rotor is milled. In this case, a suction side or a pressure side is milled on every rotor blade being manufactured.

Then the milled recesses are embedded in and/or filled with the plastic, whereby, following this, the remaining recesses between adjacent rotor blades are milled. In this step, pressure sides are now milled on rotor blades, on which suction sides were previously milled. On the other hand, suction sides are now milled on rotor blades, on which pressure sides were previously milled. Due to the fact that beforehand the first milled recesses were filled with plastic, the rotor blades are stabilized during milling so they have a lower tendency to vibrate. The plastic is removed after milling.

The method is particularly suitable when integrally bladed gas turbine rotors must be produced with relatively large and thin blade pans in the area of the rotor blades that are being manufactured by milling, such as is the case with integrally bladed rotors for low-pressure compressors for example.

The invention claimed is:

1. A method for milling machining a component, comprising: clamping a component to be machined by milling in a locating device for the milling machining, wherein the component is an integrally bladed rotor of a gas turbine, milling a first recess in the integrally bladed rotor, embedding or filling the first recess with a machinable plastic, and following the embedding or filling, milling a second recess in the integrally bladed rotor, and removing the machinable plastic from the first recess.

2. The method according to claim 1, wherein the machinable plastic is a magnetic plastic.

3. The method according to claim 2, further comprising producing chips by the milling and separating chips of the component material from chips of the magnetic plastic.

4. A method for milling machining of a component, comprising the steps of:

clamping the component in a locating device;

adjusting a vibrational property of the component by embedding an area of the component in a machinable plastic and/or filling the area with the machinable plastic; and milling machining the component;

wherein the step of adjusting a vibrational property of the component by embedding an area of the component in a machinable plastic and/or filling the area with the machinable plastic includes the steps of:

milling machining the component to define the area;

embedding and/or filling the area with the machinable plastic; and milling machining the component to define a second area.

5. The method according to claim 4, wherein the component is an integrally bladed gas turbine rotor and wherein the area defines a suction side of a rotor blade of the integrally bladed gas turbine rotor and the second area defines a pressure side of the rotor blade.

6. The method according to claim 4, wherein the component is an integrally bladed gas turbine rotor and wherein the area defines a pressure side of a rotor blade of the integrally bladed gas turbine rotor and the second area defines a suction side of the rotor blade.

* * * * *